United States Patent [19]

Deberitz et al.

[11] Patent Number: 6,063,345

[45] Date of Patent: May 16, 2000

[54] METHOD OF SEPARATING NACL FROM A LICL SOLUTION

[75] Inventors: Jürgen Deberitz, Frankfurt am Main; Klaus Köbele, Dietzenbach; Klaus Schade, Wiesbaden-Nordenstadt, all of Germany

[73] Assignee: Metallgesellschaft Aktiengesellschaft, Frankfurt am Main, Germany

[21] Appl. No.: 09/284,669

[22] PCT Filed: Oct. 30, 1997

[86] PCT No.: PCT/EP97/05994

§ 371 Date: Jun. 14, 1999

§ 102(e) Date: Jun. 14, 1999

[87] PCT Pub. No.: WO98/19966

PCT Pub. Date: May 14, 1998

[30] Foreign Application Priority Data

Nov. 4, 1996 [DE] Germany .............. 196 45 315

[51] Int. Cl.[7] .................................................. C01D 15/00
[52] U.S. Cl. ............... 423/179.5; 423/184; 423/499.3; 423/499.4; 423/194; 423/198
[58] Field of Search ................... 423/179.5, 184, 423/194, 198, 499.3, 499.4; 23/296, 300, 303

[56] References Cited

U.S. PATENT DOCUMENTS

| | | |
|---|---|---|
| 2,726,138 | 12/1955 | Cunningham . |
| 3,789,059 | 1/1974 | Cuevas . |
| 4,271,121 | 6/1981 | Brown et al. . |
| 4,723,962 | 2/1988 | Mehta . |

FOREIGN PATENT DOCUMENTS 04 193711  7/1992  Japan .

*Primary Examiner*—Steven P. Griffin
*Assistant Examiner*—Christina Ildebrando
*Attorney, Agent, or Firm*—Fulbright & Jaworski, LLP

[57] ABSTRACT

Disclosed is a method of separating NaCl from a NaCl contaminated aqueous LiCl solution involving concentration of the solution, cooling of concentrated solution and separation of the crystallized NaCl. The method is characterized in that the concentration and cooling or cooling of the solution are carried out in the presence of a base, preferably in the presence of 0.3–5 wt % (related to LiCl) of at least one alkaline or alkaline earth hydroxide or at least one easily soluble and difficultly volatile amine.

5 Claims, No Drawings

METHOD OF SEPARATING NACL FROM A LICL SOLUTION

This application is a 371 of PCT/EP97/05994, international filing date Oct. 30, 1997.

This invention relates to a process of separating NaCl from a NaCl-contaminated aqueous LiCl solution by concentrating the solution to an LiCl content>25 wt-%, cooling the concentrated solution and separating the crystallized NaCl.

Lithium chloride is an industrial raw material, from which lithium compounds and in particular metallic lithium are produced. It is necessary that the raw material lithium chloride is provided in the purest form possible, as only in this way an economic and technically efficient further processing of the lithium chloride is possible. For instance, the lithium chloride from which metallic lithium is obtained must have a rather low sodium content, as the sodium content of the metallic lithium must lie below 1%.

Aqueous solutions containing lithium chloride are either obtained as industrial raw material or in the processing of brines containing lithium. Apart from lithium, these solutions contain various impurities whose separation is performed on an industrial scale by using various known processes. The impurities include in particular sodium chloride, whose separation requires a considerable economic effort.

The known prior art includes several processes for the recovery of lithium compounds and pure lithium chloride. For instance, the DE-AS 1 228 594 describes a process of separating lithium from naturally occurring brines, which contain lithium and alkaline earths, by precipitating a lithium aluminium complex in which the brine is mixed with an aluminium compound, and the precipitation of the lithium aluminium complex is performed at a pH value of 6.0 to 8.1 and at a temperature of 20 to 100° C. The final recovery of the lithium from the lithium aluminium complex may then be effected according to various known processes, for instance by hydrothermal decomposition of the lithium aluminium complex and concentration of the diluted solutions by means of ion exchange resins or by direct treatment with ion exchange resins.

The DE-AS 1 093 783 describes a process of processing lithium ores by roasting, in order to obtain lithium salts and other alkali salts of high purity. During roasting, which is effected in the presence of calcium carbonate, sand and calcium chloride at about 1100 to 1200° C., the chlorides of lithium, sodium and potassium are evaporated and adsorbed in water. The processing of the alkali chloride solution is effected such that the chloride solution is mixed with the mixture of sodium chloride and lithium carbonate, which is precipitated in a subsequent process stage, that from this slurry solid sodium chloride is separated at a temperature of about 25 to 30° C., that by adding sodium carbonate and heating to 60 to 100° C. lithium carbonate is precipitated from the mother liquor, that the remaining residual solution is evaporated to 40 to 65% solids, where at 90 to 100° C. the mixture of sodium chloride and lithium carbonate is precipitated, with which there is mixed the alkali chloride solution obtained during roasting, and that from the residual solution potassium chloride is precipitated by cooling to about 0 to 5° C. After this process, lithium together with sodium carbonate is precipitated as lithium carbonate from the lithium chloride solution contaminated with sodium chloride, and is discharged from the process as an end product of high purity.

The U.S. Pat. No. 4,271,131 discloses a process of producing lithium chloride of high purity from a brine which in addition to a small amount of lithium also contains sodium, potassium, magnesium, sulfate and borate. In this process, the brine is evaporated in a first pond system by means of solar energy, where a concentrated brine with a lithium chloride content of 3% is obtained, and where the chlorides of sodium and potassium are in part precipitated. During the first process stage, calcium oxide and calcium chloride are added to the brine, in order to at least partly precipitate magnesium hydroxide, calcium sulfate and calcium carbonate. Upon separation of the solids, the concentrated brine is concentrated in a second process stage by evaporation in a pond system by means of solar energy to a lithium chloride content of about 25%, where a further part of the magnesium hydroxide, of the calcium sulfate and of the calcium borate is precipitated. In a third process stage, water is evaporated from the highly concentrated brine, where a contaminated solution with a lithium chloride content of about 40% is obtained. From this concentrate, anhydrous, contaminated lithium chloride is obtained by evaporation with water, which lithium chloride is extracted with isopropanol in a fourth process stage. Upon separation of the isopropanol, solid lithium chloride of high purity is isolated as end product.

Finally, it is known that solutions containing lithium chloride, which are contaminated with sodium chloride, can be purified by evaporating the solution, cooling the evaporated solution and separating the crystallized sodium chloride. This process becomes possible in that NaCl has a lower solubility in water than LiCl. NaCl has a solubility in water at 0° C. of 35.6 wt-% and at 100° C. a solubility of 39.1 wt-%. LiCl, however, has a solubility in water at 0° C. of 40.9 wt-% and at 100° C. a solubility of 55 wt-%. When all of the aforementioned alkali chlorides are present in an aqueous solution, the solubility of the sodium chloride is reduced by the presence of the lithium chloride; sodium chloride is pushed out of the solution by the lithium chloride, so to speak, and will crystallize out, where this effect becomes effective in particular when the contaminated solution is cooled to temperatures<0° C.

It is the object underlying the invention to create a process as stated above, by means of which the solubility of the lithium chloride in water can be increased or an oversaturation of the solution with lithium chloride can be achieved, namely in particular in the temperature range below 0° C. The inventive process should thus decrease the solubility of NaCl in solutions containing LiCl, in particular at low temperatures.

The object underlying the invention is solved by a process as stated above, where prior to the concentration or during the concentration or prior to cooling at least one alkaline or alkaline earth hydroxide soluble in water or at least one amine easily soluble in water and of low volatility is added to the NaCl-contaminated aqueous solution in an amount of 0.3 to 5 wt-% (based on LiCl), and where the concentrated solution is cooled to a temperature which lies between 0 and −15° C.

In accordance with the invention, $NH_4OH$ also belongs to the alkali hydroxides. In the solution, the used hydroxides and amines form OH ions, which in turn increase the solubility of LiCl and decrease the solubility of NaCl. The process in accordance with the invention operates such that either the concentration or the cooling or only the cooling of the solution in the presence of 0.3 to 5 wt-% (based on LiCl) of at least one alkaline or alkaline earth hydroxide or at least one amine easily soluble in water and of low volatility is performed. It was surprisingly found out that the crystallization temperature of lithium chloride can be decreased significantly by 0.3 to 5 wt-% of at least one alkaline or alkaline earth hydroxide or at least one amine easily soluble in water and of low volatility. For sodium chloride, the crystallization temperature is not decreased, so that finally a substantial increase in the depletion efficiency is achieved by means of the inventive process. The amine should have a high solubility in water, so that OH ions are formed sufficiently, and it should also have a low volatility, so that rather little amine will evaporate; the amine should preferably have a crystallization temperature>100° C. The inventive process is furthermore performed such that the concentrated solution is cooled to a temperature which lies between 0 and −15° C. The inventive cooling can be achieved with a comparatively simple and known cooling technique, so that the economic effort for cooling the solution is acceptable on the whole.

In many cases, the NaCl-contaminated solutions of LiCl also contain a small amount of other impurities, e.g. organic substances or heavy metal ions or mineral acids, which should at least partly be separated before performing the inventive process. This is effected in a known manner in that prior to the concentration the solution is prepurified by oxidation and/or by treatment with adsorbents and/or by neutralisation and/or by filtration. In the treatment with adsorbents, organic substances are separated; by a neutralisation, heavy metal ions are precipitated and acids are bound; by oxidation, for instance organic substances are destroyed; by filtration, the solids are separated from the solution, before the same is supplied to the process in accordance with the invention.

In accordance with the invention it is possible to introduce the alkaline and alkaline earth hydroxides as well as the amines into the solution before, during or after the concentration, where it is particularly advantageous when prior to concentrating the solution is mixed with the hydroxide or the amine.

In accordance with a further aspect of the invention it is provided that the hydroxide is formed in situ by adding a corresponding amount of an alkaline or alkaline earth oxide to the solution. For instance, the solution may be mixed with CaO, as from this oxide, which is easily available, $Ca(OH)_2$ is formed very quickly in the aqueous solution.

The process in accordance with the invention can be performed to a particular advantage when LiOH, NaOH, $Ca(OH)_2$ or $Ba(OH)_2$ is used as hydroxide, and tetraethylenepentamine is used as amine. From among the hydroxides, LiOH is preferred particularly, as it can easily be reacted with HCl to form LiCl. Furthermore, NaOH is preferred particularly, as it reacts with LiCl by ester interchange to form NaCl, which is then precipitated during cooling.

The process in accordance with the invention is advantageously performed such that the solution is concentrated to a LiCl content>25 wt-%, where the concentration up to a LiCl content of 35 to 45 wt-% is preferred. The concentration is effected in a known manner by evaporating the NaCl-contaminated LiCl solution or by dissolving solid LiCl in the LiCl solution, which has an increased content of NaCl. The evaporation is preferably performed under a reduced pressure.

The separation of the NaCl recrystallized while cooling the solution is effected by filtration or centrifugation at a temperature to which the solution was cooled. The solution is finally neutralized. The further processing of the concentrated LiCl solution, which only contains very small amounts of NaCl, may be effected in a known manner. It is either used as such, for instance in air conditioning, or LiCl is crystallized out of the concentrated solution by further evaporation. The concentrated LiCl solutions obtained in accordance with the inventive process in any case only have an NaCl content of not more than 0.3 wt-%, based on LiCl, which corresponds to an Na content of 0.12 wt-%, based on LiCl. The concentrated LiCl solution is contaminated by the alkaline earth hydroxides used in accordance with the inventive process, but the alkaline earths can easily be precipitated as oxalate or sulfate in the known manner.

The subject-matter of the invention will subsequently be explained in detail with reference to several embodiments.

EXAMPLE 1

1000 g of an aqueous solution, which contained 409 g LiCl and 6.1 g NaCl, were mixed with 8 g LiOH (1.96 wt-%, based on LiCl). The solution was cooled to −10° C. by stirring, where NaCl crystallized out. The NaCl was filtered off at −10° C. The solution poor in NaCl had an NaCl content of 0.25 wt-% (based on LiCl), which corresponds to an Na content of 0.1 wt-%. The NaCl content was thus depleted from 6.1 g to 1.02 g.

EXAMPLE 2

1000 g of an aqueous solution, which contained 409 g LiCl and 6.1 g NaCl, were mixed with 8.0 g NaOH (1.96 wt-%, based on LiCl). The solution was cooled to −10° C. by stirring. Subsequently, the crystallized NaCl was filtered off at −10° C. The solution poor in NaCl still contained 0.25 wt-% NaCl, based on LiCl, which corresponds to an Na content of 0.1 wt-%. The NaCl content was thus depleted from 6.1 g to 1.02 g.

EXAMPLE 3

1000 g of an aqueous solution, which contained 415 g LiCl and 6.2 g NaCl, were mixed with 8.3 g tetraethylenepentamine (2 wt-%, based on LiCl). The solution was then cooled to −10° C. by stirring, and the crystallized NaCl was subsequently filtered off at −10° C. The solution poor in NaCl still contained 0.24 wt-% NaCl, based on LiCl, which corresponds to an Na content of 0.096 wt-%. The NaCl content was thus depleted vom 6.2 g to 0.996 g.

EXAMPLE 4

1000 g of an aqueous solution, which contained 422 g LiCl and 6.24 g NaCl, were mixed with 1.77 g CaO. The solution was cooled to 0° C. by stirring, where from the CaO 2.34 g $Ca(OH)_2$ (0.55 wt-%, based on LiCl) were formed. Subsequently, the crystallized NaCl was filtered off at 0° C. The solution poor in NaCl still contained 0.29 wt-% NaCl, based on LiCl, which corresponds to an Na content of 0.116 wt-%. There was thus effected an NaCl depletion from 6.24 g to 1.22 g.

Examples 1 to 4 show that the used hydroxides and the used amine equally have an advantageous effect. Quite obviously, the OH ions are responsible for this effect. Examples 1 to 4 furthermore show that by cooling to 0° C. a significant depletion of the NaCl can already be achieved.

The advantageous effect of the inventive process is confirmed by the following test results:

EXAMPLE 5

At 0° C. the solubility of LiCl in water is 40.9 wt-%. When to a solution which contains 40.9 wt-% LiCl 1.96 wt-% LiOH, based on LiCl, are added, the crystallization temperature of the LiCl will decrease to about −20° C. In this way it is achieved that in a solution which contains 40.9 wt-% LiCl and about 1.5 to 3 wt-% NaCl, based on LiCl, the following residual contents of NaCl can be adjusted by the inventive depletion of NaCl:

at 20° C.=0.5 wt-%, at −3° C.=0.3 wt-%, at −5° C.=0.28 wt-% and at −10° C.=0.25 wt-%.

The test results show that the optimum temperature for cooling is about 0 to −15° C. The results show that the higher the temperature, the higher the LiCl concentration is in the solution.

Comparative Experiment:

The advantageous effect of the inventive process is particularly clearly confirmed by the following comparative experiment.

1000 g of an aqueous solution with a pH value of 7.1, which contained 440 g LiCl and 7.75 g NaCl, were cooled to +10° C. by stirring, where NaCl crystallized out. The NaCl was filtered off at 10° C. The solution poor in NaCl had an NaCl content of 0.33 wt-%, based on LiCl, which corresponds to an Na content of 0.13 wt-%, based on LiCl. The NaCl content was thus depleted from 7.75 g to 1.45 g.

A further depletion of the NaCl content would be desirable, but was not possible, as the solution could only be cooled to +10° C., for at +9° C. the LiCl was already partly precipitated, which led to disadvantageous losses of LiCl. The comparative experiment shows that the solubility limit of the LiCl can be lowered in accordance with the inventive process to such an extent that concentrated LiCl solutions with an Na content of 0.1 wt-% Na, based on LiCl, can be provided, which are in particular required for the production of metallic lithium with a low Na content.

We claim:

1. A process of separating NaCl from an NaCl-contaminated aqueous LiCl solution by concentrating the solution up to an LiCl content>25 wt-%, cooling the concentrated solution and separating the crystallized NaCl, comprising prior to concentrating or during concentrating or prior to cooling at least one water-soluble alkaline or alkaline earth hydroxide or at least one amine soluble in water and of low volatility is added to the NaCl-contaminated aqueous solution in an amount of 0.3 to 5 wt-% (based on LiCl), and that the concentrated solution is cooled to a temperature which lies between 0 and −15° C.

2. The process as claimed in claim 1, comprising prior to concentrating, the solution is mixed with the hydroxide or the amine.

3. The process as claimed in claim 1, wherein the hydroxide is formed in situ by adding a corresponding amount of an alkaline or alkaline earth oxide to the solution.

4. The process as claimed in claim 1, wherein as hydroxide LiOH, NaOH, Ca(OH)$_2$ or Ba(OH)$_2$ is used, and as amine tetraethylenepentamine is used.

5. The process as claimed in claim 1, wherein the solution is concentrated to an LiCl content of 35 to 45 wt-%.

* * * * *

UNITED STATES PATENT AND TRADEMARK OFFICE
CERTIFICATE OF CORRECTION

PATENT NO. : 6,063,345
DATED : May 16, 2000
INVENTOR(S) : Deberitz et al

It is certified that error appears in the above-identified patent and that said Letters Patent is hereby corrected as shown below:

In the cover page, in the Title, change "NACL" to -- NaCl --.
In the cover page, in the Title, change "LICL" to -- LiCl --.

Signed and Sealed this

First Day of May, 2001

Attest:

NICHOLAS P. GODICI

Attesting Officer     Acting Director of the United States Patent and Trademark Office